United States Patent
Takamatsu et al.

(10) Patent No.: US 9,301,194 B2
(45) Date of Patent: Mar. 29, 2016

(54) RADIO BASE STATION, RADIO TERMINAL, AND COMMUNICATION CONTROL METHOD FOR APPLYING A REFERENCE SIGNAL PARAMETER

(75) Inventors: Nobuaki Takamatsu, Tokyo (JP); Masahiro Yagi, Kawasaki (JP); Yoshizo Sato, Yawata (JP); Masaaki Nakata, Yamato (JP); Hiroki Fujita, Yokohama (HK)

(73) Assignee: KYOCERA Corporation, Kyoto (JP)

( * ) Notice: Subject to any disclaimer, the term of this patent is extended or adjusted under 35 U.S.C. 154(b) by 21 days.

(21) Appl. No.: 13/994,616

(22) PCT Filed: Dec. 15, 2011

(86) PCT No.: PCT/JP2011/079073
§ 371 (c)(1),
(2), (4) Date: Jun. 14, 2013

(87) PCT Pub. No.: WO2012/081674
PCT Pub. Date: Jun. 21, 2012

(65) Prior Publication Data
US 2013/0308594 A1    Nov. 21, 2013

(30) Foreign Application Priority Data
Dec. 7, 2010    (JP) .................. 2010-282317

(51) Int. Cl.
H04W 28/04    (2009.01)
H04L 5/00    (2006.01)
H04B 7/06    (2006.01)

(52) U.S. Cl.
CPC ........... *H04W 28/044* (2013.01); *H04L 5/0048* (2013.01); *H04L 5/0053* (2013.01); *H04L 5/0091* (2013.01); *H04B 7/061* (2013.01)

(58) Field of Classification Search
None
See application file for complete search history.

(56) References Cited

U.S. PATENT DOCUMENTS

| | | | |
|---|---|---|---|
| 2009/0042615 A1 | 2/2009 | Teo et al. | |
| 2009/0042616 A1* | 2/2009 | Teo et al. | 455/562.1 |
| 2010/0067410 A1* | 3/2010 | He et al. | 370/280 |
| 2010/0067464 A1* | 3/2010 | Higuchi | H04L 5/0007 370/329 |
| 2010/0080187 A1* | 4/2010 | Papasakellariou et al. | 370/329 |

(Continued)

FOREIGN PATENT DOCUMENTS

| | | |
|---|---|---|
| JP | 2009-060595 A | 3/2009 |
| JP | 2010-178129 A | 8/2010 |

(Continued)

OTHER PUBLICATIONS

International Search Report; PCT/JP2011/079073; Feb. 14, 2012.
3GPP TS 36.211 V8.7.0 (May 2009); 3rd Generation Partnership Project; Technical Specification Group Radio Access Network; Evolved Universal Terrestrial Radio Access (E-UTRA); Physical Channels and Modulation (Release 8); pp. 1-83.

(Continued)

*Primary Examiner* — Alejandro Rivero
(74) *Attorney, Agent, or Firm* — Studebaker & Brackett PC (57) ABSTRACT

An eNB1-1 transmits an RRC Connection Reconfiguration message to UE2-1 to UE2-3, in which SRS parameters and an application timing parameter are set, the SRS parameters differ for each of the UE2-1 to the UE2-3 and the application timing parameter is common in the UE2-1 to the UE2-3. The UE2-1 to the UE2-3 receive the RRC Connection Reconfiguration message and recognize the SRS parameters and the application timing parameter set in the message. Furthermore, when an application timing of the SRS parameter arrives, the UE2-1 to the UE2-3 apply the SRS parameter to the SRS and transmit the SRS.

7 Claims, 8 Drawing Sheets

(56) References Cited

U.S. PATENT DOCUMENTS

2011/0002262 A1 1/2011 Wang et al.
2014/0092851 A1 4/2014 Wang et al.

FOREIGN PATENT DOCUMENTS

JP 2010-258831 A 11/2010
WO 2010/017376 A1 2/2010

OTHER PUBLICATIONS

An Office Action; "Notice of Reasons for Rejection," issued by the Japanese Patent Office on Sep. 9, 2014, which corresponds to Japanese Patent Application No. 2010-282317 and is related to U.S. Appl. No. 13/994,616; with English language statement of relevance.

* cited by examiner

RADIO BASE STATION, RADIO TERMINAL, AND COMMUNICATION CONTROL METHOD FOR APPLYING A REFERENCE SIGNAL PARAMETER

TECHNICAL FIELD

The present invention relates to a radio base station and a radio terminal configured in a radio communication system, a communication control method in the radio base station, and a communication control method in the radio terminal.

BACKGROUND ART

According to 3GPP (Third Generation Partnership Project), in a radio communication system corresponding to standardized LTE (Long Term Evolution), a radio base station eNB assigns a radio resource (resource block: RB) to a radio terminal UE in radio communication between the eNB and the UE (for example, refer to Non Patent Literature 1). The eNB appropriately changes the resource block that is assigned to the UE. For example, the eNB assigns a wideband resource block to UE that is a transmission destination of a large amount of data, or UE with a high communication priority.

Furthermore, in the radio communication system corresponding to the LTE, one of FDD (Frequency Division Duplex) and TDD (Time Division Duplex) is employed in the radio communication between the eNB and the UE.

Moreover, in an LTE (TDD-LTE) radio communication system employing the TDD, there has been discussed a feature where the eNB calculates an antenna weight according to a reception situation of a sounding reference signal (SRS) that is an uplink radio signal transmitted by the UE, and performs control (beamforming) for adaptively directing a beam toward UE of a transmission destination when transmitting a downlink radio signal or control (null steering) for directing a null toward UE other than the transmission destination, in order to ensure communication quality between the eNB and the UE that is moving.

Under an environment in which a resource block assigned to the UE is appropriately changed, in order to perform the beamforming or the null steering, a frequency band of a resource block to be assigned to the UE needs to be included in a frequency band of SRS. That is, the frequency band of the SRS also needs to be appropriately switched.

To this end, the eNB performs the following process. The eNB transmits, to the UE, an RRC (Radio Resource Control) Connection Reconfiguration message including a parameter related to the transmission content, transmission method and the like of the SRS. The UE transmits an RRC Connection Reconfiguration Complete message to the eNB as a response message, and switches and transmits the SRS according to the parameter. The eNB calculates an antenna weight according to the reception situation of the SRS.

CITATION LIST

Non Patent Literature

Non Patent Literature 1: 3GPP TS 36.211 V8.7.0 "Physical Channels and Modulation", MAY 2009

SUMMARY OF THE INVENTION

However, conventionally, the switching timing of the SRS in the UE depends on performance of the UE, or propagation delay of the RRC Connection Reconfiguration message. Therefore, even when the eNB simultaneously transmits the RRC Connection Reconfiguration message to a plurality of UEs, the switching timings of the SRS in the UEs may not coincide with each other. Accordingly, it is probable that the plurality of UEs simultaneously transmit SRSs on the same frequency and thus a collision of the SRSs occurs.

Therefore, the present invention has been achieved in view of the above-described problems, and an object thereof is to provide a radio base station, a radio terminal, and a communication control method, with which it is possible to prevent a plurality of radio terminals from simultaneously transmitting reference signals on the same frequency.

In order to solve the aforementioned problem, the present invention has a following feature. The feature of the present invention is summarized as follows. A radio base station (eNB1-1) to which a radio terminal (UE2-1 to UE2-3) is connectable, is configured to transmit an application request message (RRC Connection Reconfiguration message) to the radio terminal, the application request message requesting the radio terminal to apply a parameter related to a reference signal (SRS) transmitted by the radio terminal, and transmit information on an application timing of the parameter to the radio terminal.

The radio base station transmits the parameter related to the reference signal to the radio terminal, and transmits the information on the application timing of the parameter to the radio terminal. Consequently, the radio terminal is able to apply the parameter at a timing based on the information on the timing, and to transmit the reference signal. Thus, the switching of the reference signal in each radio terminal can be performed at the same timing, if at all possible, and reference signals on the same frequency can be prevented from being simultaneously transmitted by a plurality of radio terminals.

The application request message may include the information on the application timing of the parameter.

The information on the application timing of the parameter may include at least one of a delay time period from a referenced time and a time indicating the application timing of the parameter.

The parameter may be at least one of a frequency band of the reference signal and a transmission cycle of the reference signal.

The feature of the present invention is summarized as follows.

A radio terminal (UE2-1 to UE2-3) that is connectable to a radio base station (eNB1-1), is configured to receive an application request message (RRC Connection Reconfiguration message) from the radio base station, the application request message requesting the radio terminal to apply a parameter related to a reference signal (SRS) transmitted by the radio terminal, and control an application timing of the parameter on the basis of stored information on the application timing of the parameter.

The radio terminal is able to apply the parameter at a timing based on the information on the application timing of the parameter related to the reference signal so as to transmit the reference signal. Thus, the switching of the reference signal in each radio terminal can be performed at the same timing, if at all possible, and reference signals on the same frequency can be prevented from being simultaneously transmitted by a plurality of radio terminals.

The radio terminal may receive the information on the application timing of the parameter from the radio base station.

The feature of the present invention is summarized as follows. A communication control method in a radio base station to which a radio terminal is connectable, comprises: a step of transmitting, from the radio base station to the radio terminal, an application request message requesting the radio terminal to apply a parameter related to a reference signal transmitted by the radio terminal, and a step of transmitting, from the radio base station to the radio terminal, information on an application timing of the parameter.

The feature of the present invention is summarized as follows. A communication control method in a radio terminal that is connectable to a radio base station, comprises: a step of receiving, by the radio terminal, an application request message from the radio base station, the application request message requesting the radio terminal to apply a parameter related to a reference signal transmitted by the radio terminal, and a step of controlling, by the radio terminal, an application timing of the parameter on the basis of stored information on the application timing of the parameter.

DESCRIPTION OF THE EMBODIMENT

Next, with reference to the drawings, the embodiment of the present invention will be described. Specifically, the description will be given of the configuration of the radio communication system, the configuration of the radio base station, the configuration of the radio terminal, the operation of the radio communication system, the operation and effect, and other embodiments. In the drawings of the embodiment below, the same or similar reference signs are applied to the same or similar portions.

(1) Configuration of Radio Communication System

Figure 1:
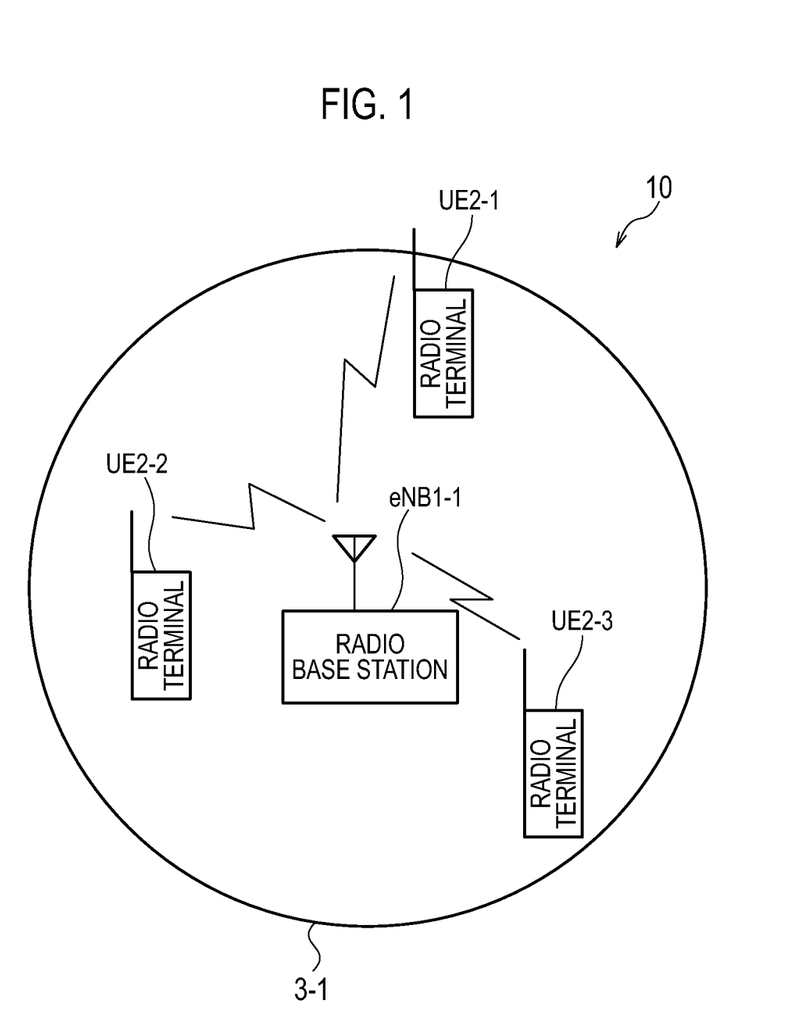
FIG. 1 is a diagram illustrating the entire schematic configuration of a radio communication system according to the embodiment of the present invention.

FIG. 1 is a diagram illustrating the entire schematic configuration of a radio communication system 10 according to the embodiment of the present invention.

The radio communication system 10 illustrated in FIG. 1 is a TDD-LTE radio communication system. The radio communication system 10 includes a radio base station (eNB) 1-1, a radio terminal (UE) 2-1, a radio terminal (UE) 2-2, and a radio terminal (UE) 2-3.

The UE 2-1 to the UE 2-3 are objects to which a resource block is assigned by the eNB 1-1. In this case, when the eNB 1-1 is employed as a reference, the UE 2-1 to the UE 2-3 are serving radio terminals. Furthermore, when eNB (not illustrated) other than the eNB 1-1 is employed as a reference, the UE 2-1 to the UE 2-3 are non-serving radio terminals.

Time division duplex is employed in radio communication between the eNB 1-1 and the UE 2-1 to the UE 2-3, and OFDMA (Orthogonal Frequency Division Multiplexing Access) is employed in downlink radio communication, and SC-FDMA (Single Carrier Frequency Division Multiple Access) is employed in uplink radio communication. Furthermore, downlink indicates a direction from the eNB 1-1, to the UE 2-1 to the UE 2-3. Uplink indicates a direction from the UE 2-1 to the UE 2-3, to the eNB 1-1.

The eNB 1-1 assigns a resource block (RB) to the UE 2-1 to the UE 2-3 in a cell 3-1 as a radio resource.

The resource block includes a downlink resource block (downlink RB) to be used in the downlink radio communication and an uplink resource block (uplink RB) to be used in the uplink radio communication. A plurality of downlink resource blocks are arranged in the frequency direction and the time-period direction. Similarly, a plurality of uplink resource blocks are arranged in the frequency direction and the time-period direction.

Figure 2:
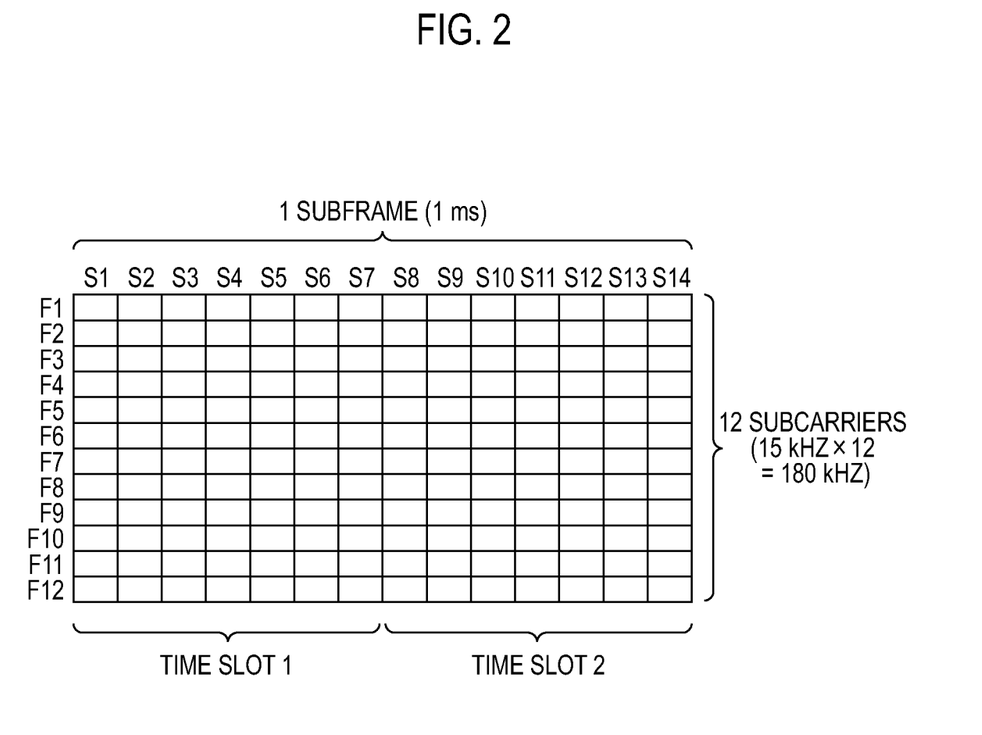
FIG. 2 is a diagram illustrating a format of the resource block according to the embodiment of the present invention.

FIG. 2 is a diagram illustrating a format of the resource block. As illustrated in FIG. 2, the resource block is configured by one subframe having a time length of 1 [ms] in the time-period direction. The subframe includes a symbol S1 to a symbol S14. Among the symbol S1 to the symbol S14, the symbol S1 to the symbol S7 constitute a first half time slot (a time slot 1) and the symbol S8 to the symbol S14 constitute a latter half time slot (a time slot 2).

As illustrated in FIG. 2, the resource block has a frequency width of 180 [kHz] in the frequency direction. Furthermore, the resource block includes 12 subcarriers F1 to F12 having a frequency width of 15 [kHz].

Figure 3:
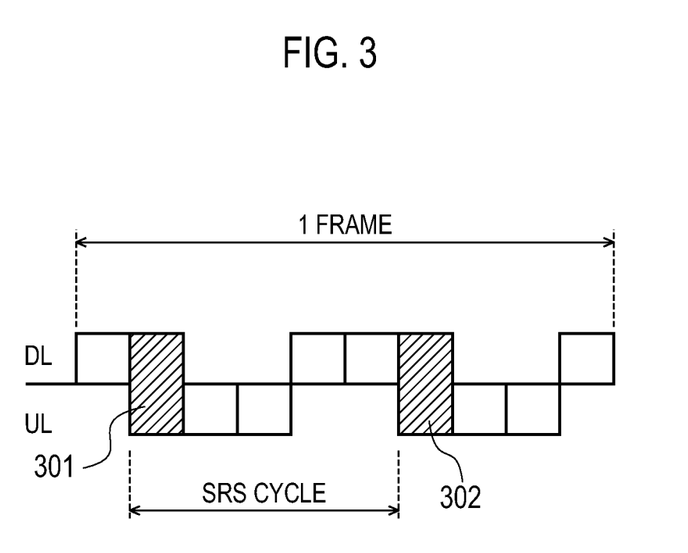
FIG. 3 is a diagram illustrating a format of the frame according to the embodiment of the present invention.

Furthermore, in the time-period direction, a plurality of subframes constitute one frame. FIG. 3 is a diagram illustrating a format of the frame. The frame illustrated in FIG. 3 includes 10 subframes. The frame includes 10 subframes in the sequence of a subframe of a downlink resource block, subframes (special subframes: SSF) of both the downlink resource block and an uplink resource block, a subframe of the uplink resource block, a subframe of the uplink resource block, a subframe of the downlink resource block, a subframe of the downlink resource block, a special subframe, a subframe of the uplink resource block, a subframe of the uplink resource block, and a subframe of the downlink resource block. Hereinafter, of the two special subframes included in one frame, the anterior special subframe is referred to as a first SSF301 and the posterior special subframe is referred to as a second SSF302. In the special subframes, within the subframe, the first half time slot is used for downlink radio communication and the latter half time slot is used for uplink radio communication across a guard time.

Furthermore, in the frequency direction, a frequency band of a radio resource available in the radio communication between the eNB 1-1 and the UE 2-1 to the UE 2-3, in other words, a frequency band (an assignment frequency band) assignable to the UE 2-1 has a band corresponding to the number of a plurality of resource blocks.

Figure 4:
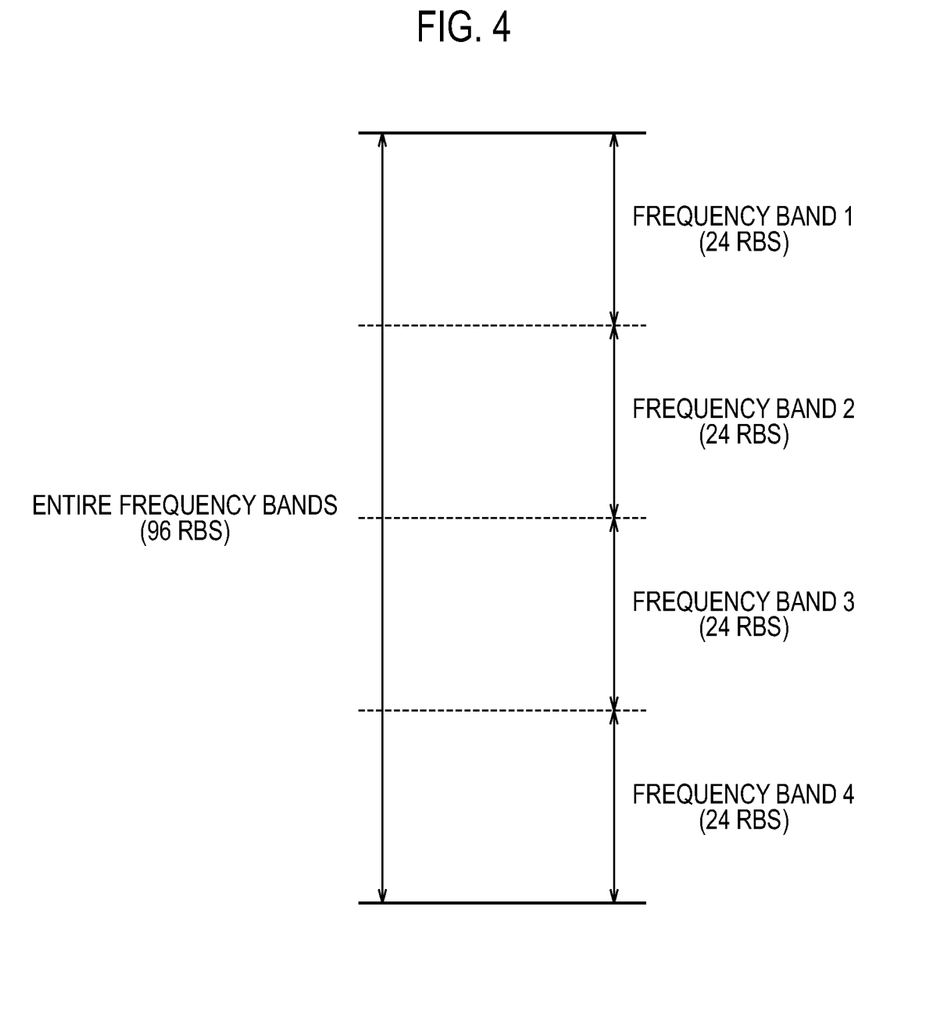
FIG. 4 is a diagram illustrating the configuration of the frequency band available in the radio communication between the radio base station and the radio terminal according to the embodiment of the present invention.

FIG. 4 is a diagram illustrating the configuration of the frequency band available in the radio communication between the eNB 1-1 and the UE 2-1 to the UE 2-3. An entire frequency band available in the radio communication between the eNB 1-1 and the UE 2-1 to the UE 2-3 is a band corresponding to 100 resource blocks. However, as illustrated in FIG. 4, it is assumed that a band corresponding to 96 resource blocks are used in the radio communication between the eNB 1-1 and the UE 2-1 to the UE 2-3. Furthermore, the frequency band is divided into a frequency band 1 to a frequency band 4, wherein each frequency band has a band corresponding to 24 resource blocks.

The downlink resource block is configured by a control information channel (PDCCH: Physical Downlink Control CHannel) for downlink control information transmission and a shared data channel (PDSCH: Physical Downlink Shared CHannel) for downlink user data transmission, in the time-period direction.

On the other hand, in the uplink resource block, a control information channel (PUCCH: Physical Uplink Control CHannel) for uplink control information transmission is configured at both ends of the entire frequency band available in the uplink radio communication, and a shared data channel (PUSCH: Physical Uplink Shared CHannel) for uplink user data transmission is configured in the central part.

(2) Configuration of Radio Base Station

Figure 5:
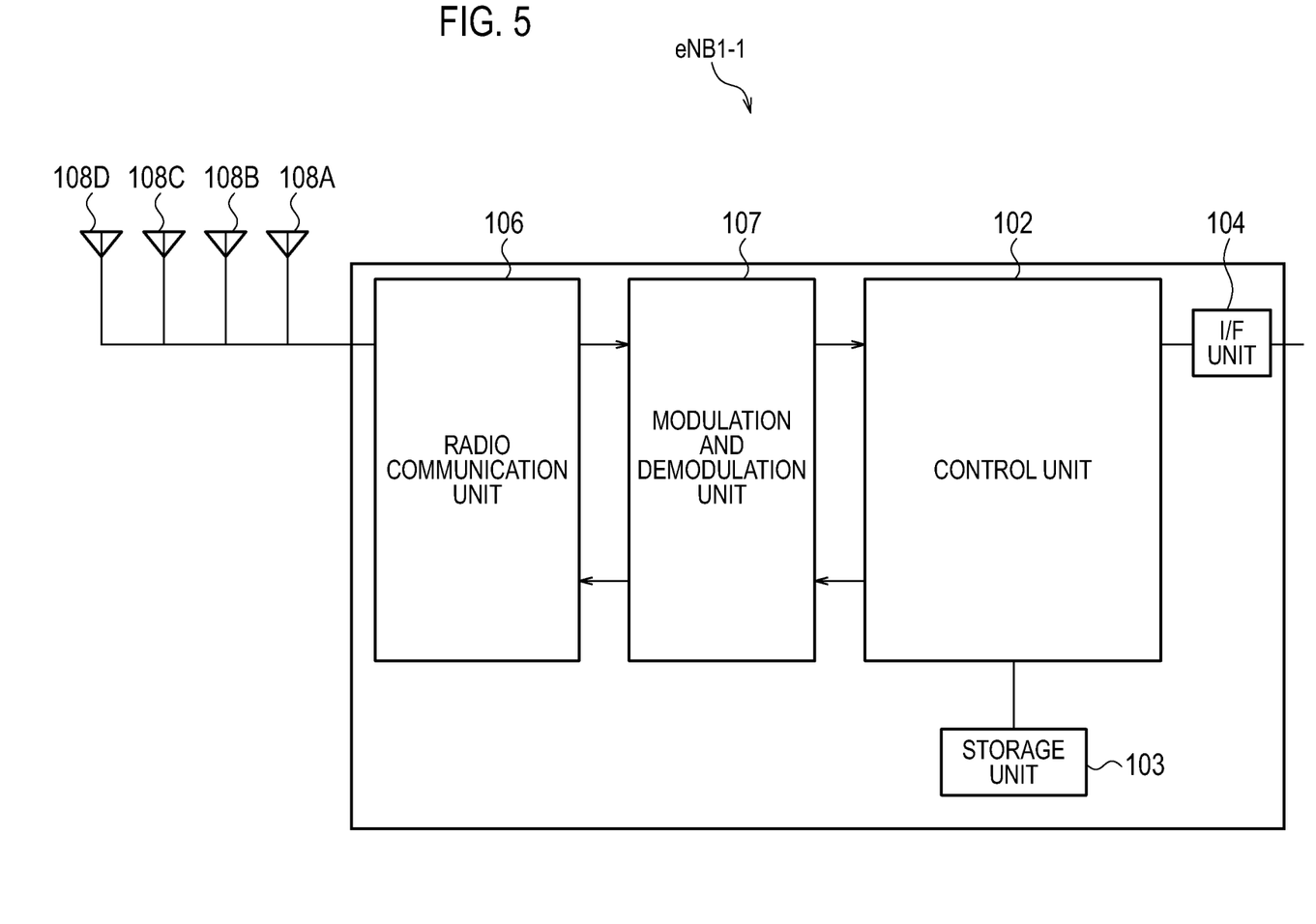
FIG. 5 is a configuration diagram of the radio base station according to the embodiment of the present invention.

FIG. 5 is a configuration diagram of the eNB 1-1. As illustrated in FIG. 5, the eNB 1-1 is a radio base station of an adaptive array scheme, which applies an antenna weight to an array antenna configured by a plurality of antenna elements, and includes a control unit 102, a storage unit 103, an I/F unit 104, a radio communication unit 106, a modulation and demodulation unit 107, an antenna element 108A, an antenna element 108B, an antenna element 108C, and an antenna element 108D. The antenna element 108A to the antenna element 108D constitute the array antenna.

The control unit 102, for example, is configured by a CPU, and controls various functions provided in the eNB 1-1. The control unit 102 performs the setting of a transmission frequency band of a sounding reference signal (SRS), the assignment of a resource block (RB) to the UE 2-1 to the UE 2-3, the calculation of an antenna weight, and the like. The storage unit 103, for example, is configured by a memory, and stores various types of information used for the control and the like of the eNB 1-1.

The I/F unit 104 is able to communicate with another eNB through an X2 interface. Furthermore, the I/F unit 104 is able to communicate with EPC (Evolved Packet Core) that is not illustrated in the diagram, more specifically, with MME (Mobility Management Entity)/S-GW (Serving Gateway) through an S1 interface.

The radio communication unit 106 receives an uplink radio signal, which is transmitted from the UE 2-1, through the antenna element 108A to the antenna element 108D. Moreover, the radio communication unit 106 converts (down-converts) the received uplink radio signal to a baseband signal, and outputs the baseband signal to the modulation and demodulation unit 107.

The modulation and demodulation unit 107 performs demodulation and decoding processes for the input baseband signal. In this way, data included in the uplink radio signal transmitted by the UE 2-1 is obtained. The data is output to the control unit 102.

Furthermore, the modulation and demodulation unit 107 performs encoding and modulation of data from the control unit 102, thereby obtaining a baseband signal. The radio communication unit 106 converts (up-converts) the baseband signal to a downlink radio signal. Moreover, the radio communication unit 106 transmits the downlink radio signal through the antenna element 108A to the antenna element 108D.

The control unit 102 sets frequency bands (SRS transmission frequency bands), which are used when the UE 2-1 to the UE 2-3 transmit the sounding reference signal (SRS) at the timing of the special subframe, in the UE 2-1 to the UE 2-3. Here, the SRS is a signal to be referred to in the calculation of the antenna weight in the eNB 1-1, and is an uplink radio signal of a radio frequency band.

Specifically, the control unit 102 sets a parameter corresponding to bandwidths of the SRS transmission frequency bands, a parameter corresponding to center frequencies of the SRS transmission frequency bands, and an SRS-related parameter (an SRS parameter) such as an SRS transmission cycle. The SRS transmission frequency bands are set such that the SRS transmission frequency bands do not overlap each other in the UE 2-1 to the UE 2-3. Accordingly, the SRS parameter differs for each of the UE 2-1 to the UE 2-3. For example, as the amount of data to be transmitted to the UE is larger, the control unit 102 sets a wider SRS transmission frequency band corresponding to the UE. Furthermore, as the priority of the UE in the radio communication is high, the control unit 102 sets a wide SRS transmission frequency band corresponding to the UE.

Next, the control unit 102 sets the SRS parameter in SoundingRS-UL-Config that is an information element of an RRC (Radio Resource Control) Connection Reconfiguration message.

The control unit 102 generates a parameter (an application timing parameter) related to a timing at which the SRS parameter is applied when the UE switches the SRS. For example, the application timing parameter indicates information for requesting the UE to apply the SRS parameter in a frame after a predetermined number of frames from a frame in which the RRC Connection Reconfiguration message was received. Alternatively, the application timing parameter indicates information on an absolute time indicating an application timing of the SRS parameter.

Next, the control unit 102 sets the same common application timing parameter in the SoundingRS-UL-Config that is the information element of each RRC (Radio Resource Control) Connection Reconfiguration message.

Moreover, the control unit 102 outputs, to the modulation and demodulation unit 107, the RRC Connection Reconfiguration message for each of the UE 2-1 to the UE 2-3, in which the SRS parameter and the application timing parameter are set.

The modulation and demodulation unit 107 performs coding and modulation of the RRC Connection Reconfiguration message, thereby obtaining a baseband signal. The radio communication unit 106 converts the baseband signal to a downlink radio signal, and transmits the downlink radio signal through the antenna element 108A to the antenna element 108D.

In addition, the transmission of the RRC Connection Reconfiguration message for each of the UE 2-1 to the UE 2-3 needs not to be simultaneously performed for the UEs. For example, when the application timing parameter indicates information for requesting the UE to apply the SRS parameter in a frame after a predetermined number of frames from a frame in which the RRC Connection Reconfiguration message was received, it is sufficient if the RRC Connection Reconfiguration message is transmitted such that reception timings of the RRC Connection Reconfiguration message in the UE 2-1 to the UE 2-3 are collected in the same frame. Furthermore, when the application timing parameter indicates information on an absolute time indicating an application timing of the SRS parameter, it is sufficient if the RRC Connection Reconfiguration message is transmitted no later than a predetermined time period before the absolute time arrives.

The UE 2-1 to the UE 2-3 receive a downlink radio signal corresponding to the RRC Connection Reconfiguration message.

The UE 2-1 to the UE 2-3 recognize the SRS transmission frequency band, the SRS transmission cycle and the like, which are the SRS parameter, on the basis of the SRS parameter set in the RRC Connection Reconfiguration message. Furthermore, the UE 2-1 to the UE 2-3 recognize the application timing of the SRS parameter on the basis of the application timing parameter set in the RRC Connection Reconfiguration message.

If the timing of the special subframe corresponding to the application timing of the SRS parameter arrives, the UE 2-1 to the UE 2-3 transmit SRS using the recognized SRS transmission frequency band. Then, the UE 2-1 to the UE 2-3 transmit SRS whenever a transmission timing determined with the SRS transmission cycle arrives.

The radio communication unit 106 of the eNB 1-1 receives the SRS, which is transmitted from the UE 2-1 to the UE 2-3, through the antenna element 108A to the antenna element 108D. In addition, the radio communication unit 106 converts the received SRS to a baseband signal, and outputs the baseband signal to the modulation and demodulation unit 107. Furthermore, the radio communication unit 106 outputs the information about the frequency band of the received SRS to the control unit 102. The modulation and demodulation unit 107 performs demodulation and decoding processes for the input baseband signal. In this way, data included in the SRS transmitted by the UE 2-1 to the UE 2-3 is obtained. The data is output to the control unit 102.

The control unit 102 assigns a downlink resource block to the UE 2-1 to the UE 2-3.

Furthermore, the control unit 102 calculates an antenna weight (a reception weight) at which a signal-to-interference noise ratio (SINR) at the time of reception of the SRS is maximum, for each of the antenna element 108A to the antenna element 108D, and sets the reception weight as a transmission weight.

Then, the control unit 102 transmits a downlink radio signal to the UE 2-1 using the assigned downlink resource block through the modulation and demodulation unit 107, the radio communication unit 106, and the antenna element 108A to the antenna element 108D.

(3) Configuration of Radio Terminal

Figure 6:
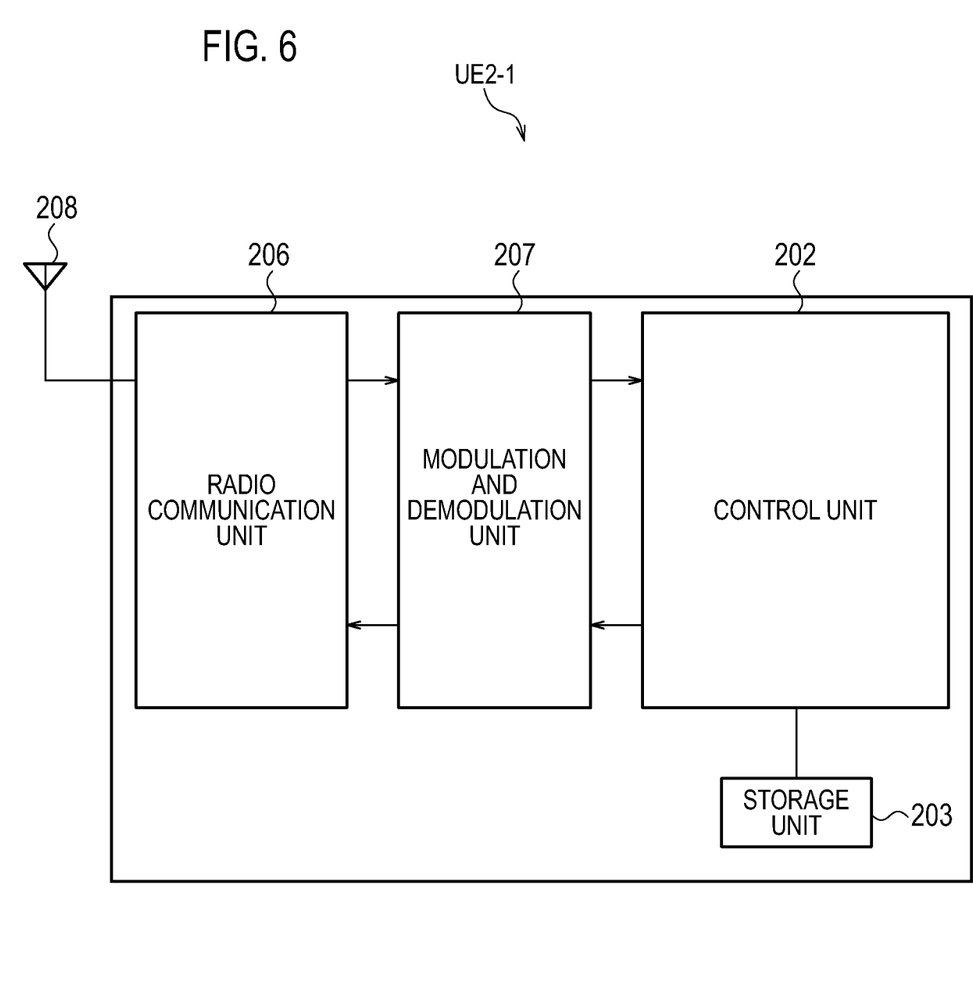
FIG. 6 is a configuration diagram of the radio terminal according to the embodiment of the present invention.

FIG. 6 is a configuration diagram of the UE 2-1. As illustrated in FIG. 6, the UE 2-1 includes a control unit 202, a storage unit 203, a radio communication unit 206, a modulation and demodulation unit 207, and an antenna 208. The UE 2-2 and the UE 2-3 also have the same configuration.

The control unit 202, for example, is configured by a CPU, and controls various functions provided in the UE 2-1. The control unit 202 sets a transmission frequency band of SRS. The storage unit 203, for example, is configured by a memory, and stores various types of information used for the control and the like of the UE 2-1.

The radio communication unit 206 receives the downlink radio signal, which is transmitted from the eNB 1-1, through the antenna 208. Moreover, the radio communication unit 206 converts (down-converts) the received downlink radio signal to a baseband signal, and outputs the baseband signal to the modulation and demodulation unit 207.

The modulation and demodulation unit 207 performs demodulation and decoding processes for the input baseband signal. In this way, data included in the downlink radio signal, which is transmitted from the eNB 1-1, is obtained. The data is output to the control unit 202.

Furthermore, the modulation and demodulation unit 207 performs encoding and modulation of the data from the control unit 202 to obtain a baseband signal. The radio communication unit 206 converts (up-converts) the baseband signal to an uplink radio signal. Moreover, the radio communication unit 206 transmits the uplink radio signal through the antenna 208.

The control unit 202 receives an RRC Connection Reconfiguration message, which corresponds to the downlink radio signal from the eNB 1-1, through the antenna 208, the radio communication unit 206, and the modulation and demodulation unit 207.

The control unit 202 recognizes the SRS transmission frequency band, the SRS transmission cycle, and the like, which are the SRS parameter set in the RRC Connection Reconfiguration message. Furthermore, the control unit 202 recognizes the application timing of the SRS parameter on the basis of the application timing parameter set in the RRC Connection Reconfiguration message.

If the timing of the special subframe corresponding to the application timing of the SRS parameter arrives, the control unit 202 transmits SRS using the recognized SRS transmission frequency band through the modulation and demodulation unit 207, the radio communication unit 206, and the antenna 208.

Then, the control unit 202 transmits SRS through the modulation and demodulation unit 207, the radio communication unit 206, and the antenna 208 whenever a transmission timing determined with the SRS transmission cycle arrives.

Figure 7:
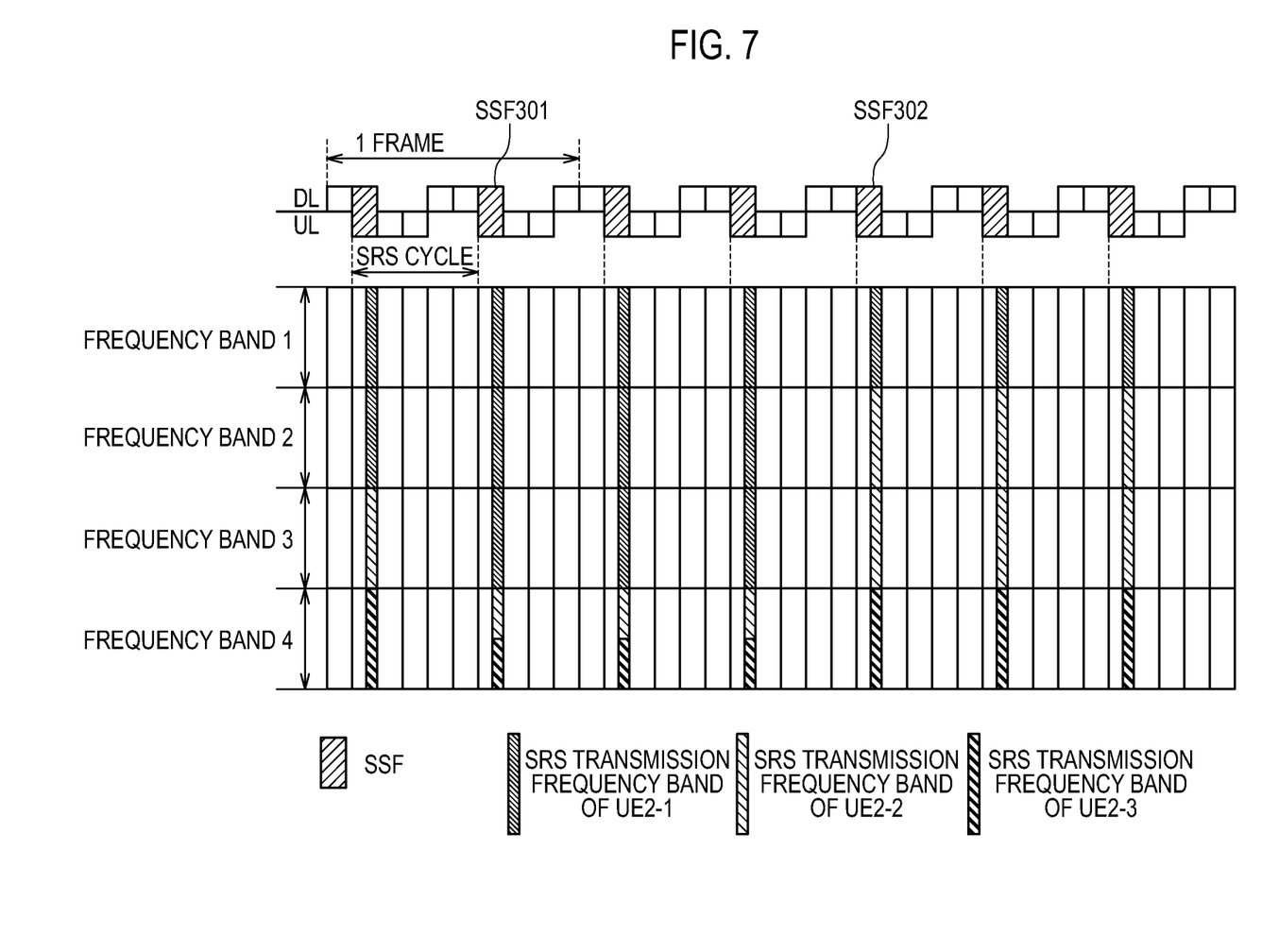
FIG. 7 is a diagram illustrating time transition of the transmission frequency band of SRS according to the embodiment of the present invention.

FIG. 7 is a diagram illustrating time transition of the transmission frequency band of SRS. In FIG. 7, it is assumed that an application timing parameter indicating the special subframe 301 has been set in an RRC Connection Reconfiguration message initially received by the UE 2-1 to the UE 2-3 and an application timing parameter indicating the special subframe 302 has been set in an RRC Connection Reconfiguration message subsequently received by the UE 2-1 to the UE 2-3.

In this case, when the timing of the special subframe 301 arrives, the UE 2-1 to the UE 2-3 switch the transmission frequency band of the SRS on the basis of an SRS parameter included in the initially received RRC Connection Reconfiguration message, and transmits the SRS. In the example of FIG. 7, the UE 2-1 switches the transmission frequency band of the SRS to a frequency band 1, a frequency band 2, and a frequency band 3, and transmits the SRS. The UE 2-2 switches the transmission frequency band of the SRS to a frequency band corresponding to a half of a frequency band 4, and transmits the SRS. The UE 2-3 switches the transmission frequency band of the SRS to the other half of the frequency band 4, and transmits the SRS. Then, the UE 2-1 to the UE 2-3 transmit SRS after the switching at a timing of a special subframe.

Moreover, when the timing of the special subframe 302 arrives, the UE 2-1 to the UE 2-3 switch the transmission frequency band of the SRS on the basis of the SRS parameter included in the subsequently received RRC Connection Reconfiguration message, and transmits the SRS. In the example of FIG. 7, the UE 2-1 switches the transmission frequency band of the SRS to the frequency band 1, and transmits the SRS. The UE 2-2 switches the transmission frequency band of the SRS to the frequency band 2 and the frequency band 3, and transmits the SRS. The UE 2-3 switches the transmission frequency band of the SRS to the frequency band 4, and transmits the SRS. Then, the UE 2-1 to the UE 2-3 transmit SRS after the switching at a timing of a special subframe.

(4) Operation of Radio Communication System

Figure 8:
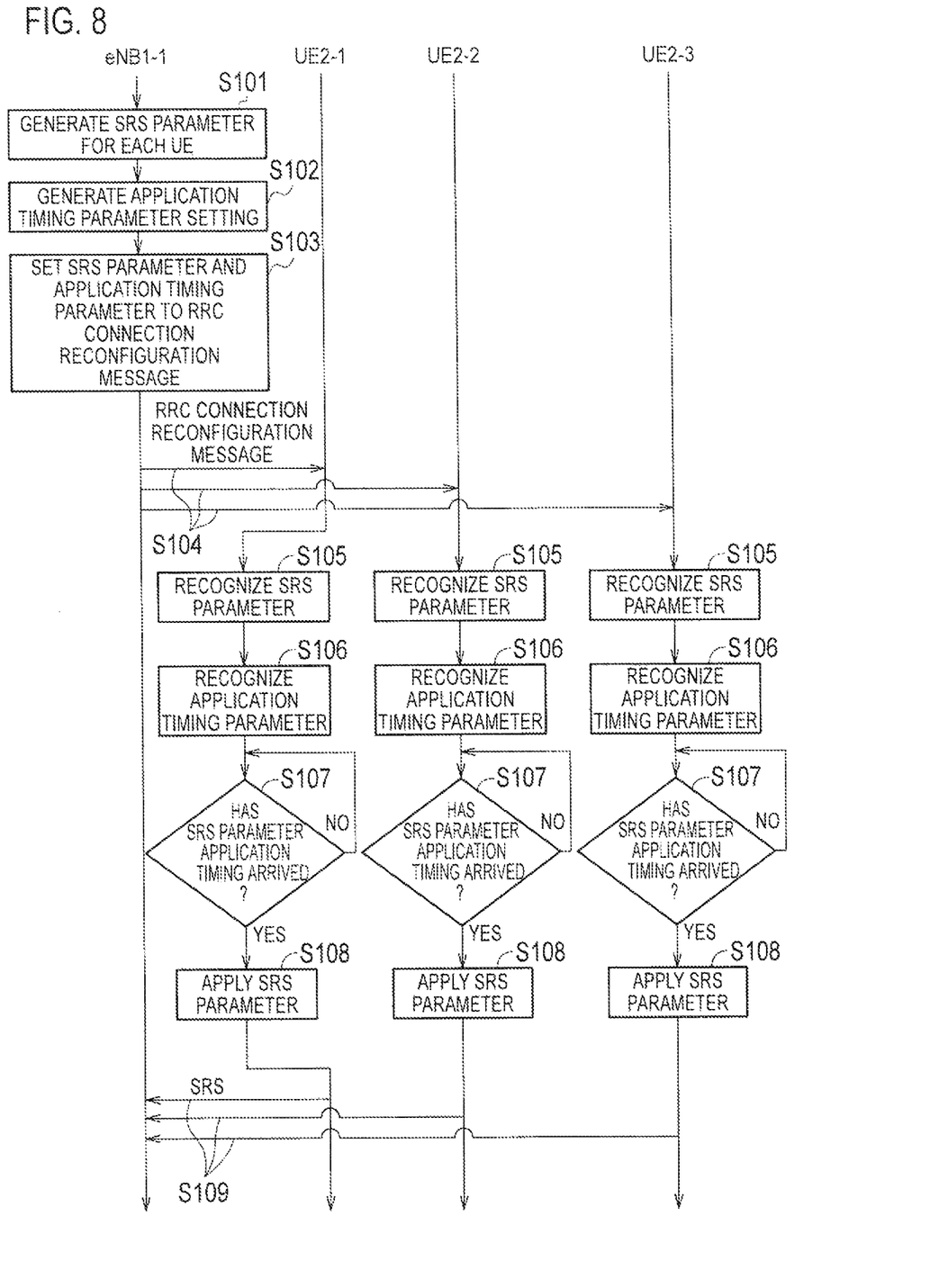
FIG. 8 is a sequence diagram illustrating the operation of the radio communication system according to the embodiment of the present invention.

FIG. 8 is a sequence diagram illustrating the operation of the radio communication system 10.

In step S101, the eNB 1-1 generates an SRS parameter for each of the UE 2-1 to the UE 2-3.

In step S102, the eNB 1-1 generates an application timing parameter common in the UE 2-1 to the UE 2-3.

In step S103, the eNB 1-1 sets the SRS parameter and the application timing parameter in an RRC Connection Reconfiguration message for each of the UE 2-1 to the UE 2-3.

In step S104, the eNB 1-1 transmits the RRC Connection Reconfiguration message corresponding to the UE to the UE 2-1 to the UE 2-3. The UE 2-1 to the UE 2-3 receive the RRC Connection Reconfiguration messages corresponding to the UE -1 to the UE 2-3, respectively.

In step S105, the UE 2-1 to the UE 2-3 recognize the SRS parameter included in the RRC Connection Reconfiguration message.

In step S106, the UE 2-1 to the UE 2-3 recognize the application timing parameter included in the RRC Connection Reconfiguration message.

In step S107, the UE 2-1 to the UE 2-3 determine whether the application timing of the SRS parameter, which is indicated by the application timing parameter, are reached.

When the application timing of the SRS parameter arrives, the UE 2-1 to the UE 2-3 apply the SRS parameter to SRSs in step S108.

In step S109, the UE 2-1 to the UE 2-3 transmit the SRS with the SRS parameter applied thereto. The eNB 1-1 receives the SRS.

(5) Operation and Effect

As described above, according to the present embodiment, the eNB 1-1 transmits, to the UE 2-1 to the UE 2-3, the RRC Connection Reconfiguration message in which the SRS parameter and the application timing parameter are set, wherein the SRS parameter differs for each of the UE 2-1 to the UE 2-3 and the application timing parameter is common in the UE 2-1 to the UE 2-3. The UE 2-1 to the UE 2-3 receive the RRC Connection Reconfiguration message, and recognize the SRS parameter and the application timing parameter set in the message. Moreover, when the application timing of the SRS parameter indicated by the application timing parameter arrives, the UE 2-1 to the UE 2-3 apply the SRS parameter to SRS and transmit the SRS.

The application timing parameter is set in the RRC Connection Reconfiguration message transmitted from the eNB 1-1, to the UE 2-1 to the UE 2-3, so that the switching of SRSs in the UE 2-1 to the UE 2-3 can be performed at the same timing, if at all possible, and SRSs on the same frequency can be prevented from being simultaneously transmitted by the UE 2-1 to the UE 203.

Furthermore, since the frequency bands of the SRSs transmitted by the UE 2-1 to the UE 2-3 do not overlap one another, when the eNB 1-1 calculates an antenna weight according to a reception situation of the SRSs and performs beamforming and null steering, the performance of the beamforming and null steering is improved.

(6) Other Embodiments

As mentioned above, the present invention has been described according to the embodiment. However, it must not be understood that the discussions and the drawings constituting a part of this disclosure limit the present invention. From this disclosure, various alternative embodiments, examples and operational techniques are apparent to those skilled in the art.

In the aforementioned embodiment, the eNB 1-1 sets the application timing parameter, which is common in the UE 2-1 to the UE 2-3, in the RRC Connection Reconfiguration message, and transmits the RRC Connection Reconfiguration message. Meanwhile, the UE 2-1 to the UE 2-3 recognize the application timing parameter set in the received RRC Connection Reconfiguration message.

However, in the whole of the radio communication system 10, a common application timing parameter may be prepared in advance and may be stored in the storage units 203 of the UE 2-1 to the UE 2-3.

In this case, the control unit 102 of the eNB 1-1 sets only the SRS parameter in the RRC Connection Reconfiguration message, and transmits the RRC Connection Reconfiguration message.

Meanwhile, the control units 202 of the UE 2-1 to the UE 2-3 recognize the SRS parameter set in the received RRC Connection Reconfiguration message, and recognize the application timing parameter stored in the storage units 203. Moreover, when the application timing of the SRS parameter arrives, the control units 202 apply the SRS parameter to SRS, and transmit the SRS.

Furthermore, in the aforementioned embodiment, the timing of the special subframe is used as the transmission timing of SRS in the UE 2-1 to the UE 2-3. However, the transmission timing of the SRS is not limited thereto. For example, it is sufficient if the transmission timing of the SRS is a common timing agreed in advance between the eNB 1-1 and the UE 2-1 to the UE 2-3. However, it is preferable that the transmission timing of the SRS arrives at least once in a time period of one frame.

Furthermore, in the aforementioned embodiment, the eNB 1-1 uses the reception weight as the transmission weight. However, the transmission weight may be calculated regardless of the reception weight. Thus, it must be understood that the present invention includes various embodiments that are not described herein.

Note that the entire content of the Japanese Patent Application No. 2010-282317 (filed on Dec. 17, 2010) is incorporated herein by reference.

INDUSTRIAL APPLICABILITY

As mentioned above, a radio base station, a radio terminal, and a communication control method according to the present invention are useful in radio communication, of which the radio base station controls the application timing of the parameter related to the SRS.

The invention claimed is:

1. A radio base station to which a plurality of radio terminals are connectable, configured to
   transmit an application request message to each of the plurality of radio terminals, the application request message requesting a radio terminal to apply a reference signal parameter being a reference signal transmission frequency band, and
   transmit, to each of the plurality of radio terminals, an application timing parameter for the plurality of radio terminals to switch the reference signal transmission frequency band at same timing on the basis of the reference signal parameter,
   wherein the reference signal parameter assigned to the radio terminal differs from and does not overlap a reference signal parameter assigned to each of the other plurality of radio terminals connectable to the radio base station.

2. The radio base station according to claim 1, wherein the application request message includes the application timing parameter for the plurality of radio terminals to simultaneously transmit the reference signal.

3. The radio base station according to claim 1, wherein the application timing parameter for the plurality of radio terminals to simultaneously transmit the reference signal includes at least one of a delay time period from a referenced time and a time indicating an application timing of the reference signal parameter.

4. A radio terminal that is connectable to a radio base station connectable to a plurality of radio terminals, configured to
  receive an application request message from the radio base station, the application request message requesting the radio terminal to apply a reference signal parameter being a reference signal transmission frequency band, and
  control an application timing of the reference signal parameter on the basis of stored application timing parameter for the plurality of radio terminals to switch the reference signal tranmission frequency band at same timing on the basis of the reference signal parameter, wherein
  the reference signal parameter differs from and does not overlap a reference signal parameter assigned to each other radio terminal of the plurality of radio terminals connectable to the radio base station.

5. The radio terminal according to claim 4, receiving, from the radio base station, the application timing parameter for the plurality of radio terminals to simultaneously transmit the reference signal.

6. A communication control method in a radio base station to which a plurality of radio terminals are connectable, comprising:
  a step of transmitting, from the radio base station to each of the plurality of radio terminals, an application request message requesting a radio terminal to apply a reference signal parameter being a reference signal transmission frequency band, and
  a step of transmitting, from the radio base station to each of the plurality of radio terminals, an application timing parameter for the plurality of radio terminals to switch the reference signal transmission frequency band at same timing on the basis of the reference signal parameter, wherein
  the reference signal parameter assigned to the radio terminal differs from and does not overlap a reference signal parameter assigned to each other radio terminal of the plurality of radio terminals connectable to the radio base station.

7. A communication control method in a radio terminal that is connectable to a radio base station connectable to a plurality of radio terminals, comprising:
  a step of receiving, by the radio terminal, an application request message from the radio base station, the application request message requesting the radio terminal to apply a reference signal parameter being a reference signal transmission frequency band, and
  a step of controlling, by the radio terminal, an application timing of the reference signal parameter on the basis of stored application timing parameter for the plurality of radio terminals to switch the reference signal transmission frequency band at same timing on the basis of the reference signal parameter, wherein
  the reference signal parameter differs from and does not overlap a reference signal parameter assigned to each other radio terminal connectable to the radio base station.

* * * * *